United States Patent [19]

Donze et al.

[11] 4,389,261
[45] Jun. 21, 1983

[54] PROCESS FOR CUTTING METAL MEMBERS BY MEANS OF JETS OF GAS WHICH ISSUE AT THE PERIPHERY OF A ROTARY DISC

[75] Inventors: Michel Donze, Liverdun; Severino Rugi, Moyeuvre Grande, both of France

[73] Assignee: Etablissements Somalor-Ferrari 'Somafer', Uckange, France

[21] Appl. No.: 394,172

[22] Filed: Jul. 1, 1982

[30] Foreign Application Priority Data

Jul. 10, 1981 [FR] France ................................. 81 14041

[51] Int. Cl.³ .............................................. B23K 7/02
[52] U.S. Cl. .................................................... 148/9 R

[58] Field of Search ................. 148/9 R, 9 C, 9.5, 9.6; 266/48

[56] References Cited

U.S. PATENT DOCUMENTS 2,680,486  6/1954  Carpenter ........................... 148/9 R Primary Examiner—W. Stallard
Attorney, Agent, or Firm—Dennison, Meserole, Pollack & Scheiner

[57] ABSTRACT

A process for cutting metal members 3 by means of jets of gas emitted by nozzles ($a_1, a_2, a_3 \ldots a_{63}$) which are disposed at regular spacings on the periphery 2 of the disc 1 which rotates at high speed.

Preheating for initiating the cutting is provided by a heating nozzle b.

2 Claims, 1 Drawing Figure

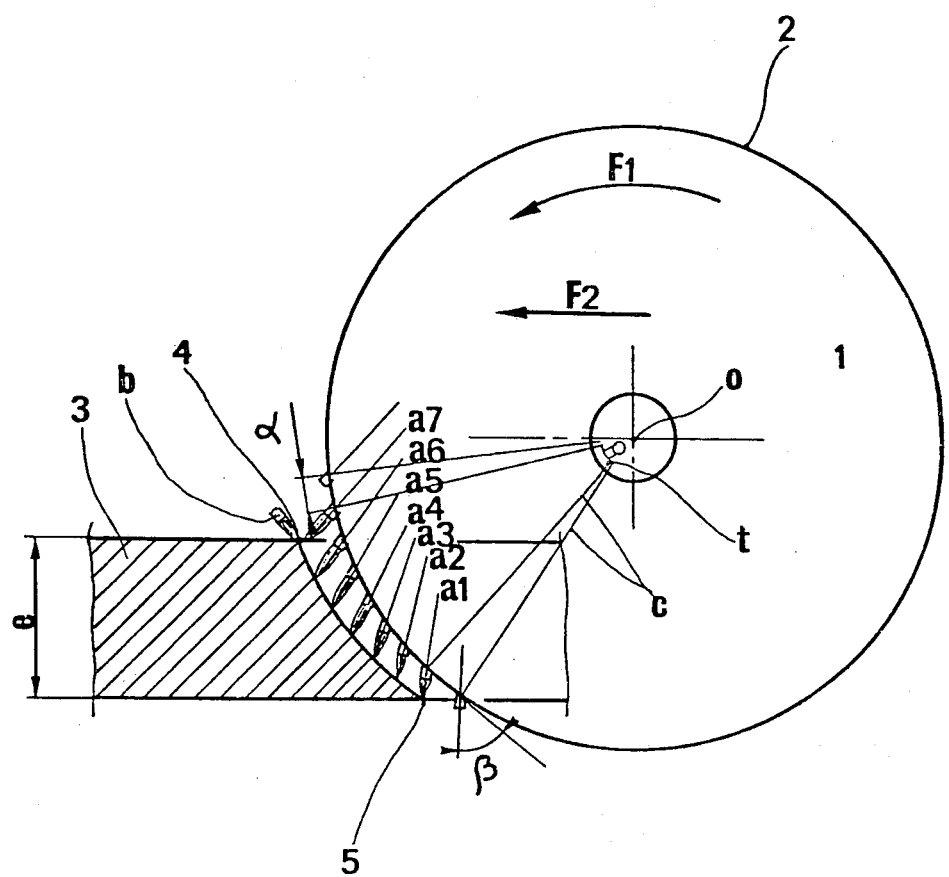

PROCESS FOR CUTTING METAL MEMBERS BY MEANS OF JETS OF GAS WHICH ISSUE AT THE PERIPHERY OF A ROTARY DISC

Developments in the metallurgical industry result in the continuous production of members of substantial dimensions, heavy metal sheets, ingots or slabs. Such members, which are of the order of 300 mm or even 500 mm in thickness, are then cut to the dimensions which are appropriate for the use envisaged for such members, by gas cutting.

The traditional process of cutting by means of gas comprises forming in the member a cut which extends through the entire thickness thereof, under the effect of a single, very powerful jet of oxygen, which is directed substantially perpendicularly to the member. The nozzle from which the jet issues is displaced laterally, while remaining at a distance of a few centimeters above the surface of the member.

In order for the cut to extend through the entire thickness of the member, the jet of oxygen is required not only to burn the metal but also to carry away the molten metal, impurities and oxides, over the entire thickness of the member, along the leading edge of the cut. When dealing with substantial thicknesses, in order to produce a rapid cutting action, it is necessary to inject oxygen in an ever increasing amount and at ever increasing velocities. When dealing with members which are from 300 to 500 mm in thickness, a cut which is from 10 to 15 mm in width has to be formed in the metal, using a large torch which consumes an oxygen flow rate of the order of from 80 to 150 $Nm^3/h$, using nozzles which are more than 4 mm in diameter.

The width of the above-mentioned cut corresponds to a substantial loss of metal. It results in severe overheating and in most cases causes deterioration in the characteristics of the metal which is in the vicinity, and that may make it necessary to perform a subsequent heat treatment.

At the same time, the level of efficiency in regard to oxygen is very mediocre. The molecules which are at the center of the jet do not come into contact with the metal to be burnt. Only the kinetic energy of such molecules is utilized to carry away the liquid metal and the slag. A substantial proportion of such liquid metal and slag solidifies however, forming two wide, hard beads which adhere strongly to the metal on each side of the cut and which may be up to several centimeters in thickness. The beads have to be removed using a pneumatic chisel, a grinding wheel or a blow torch, before the rolling operation is carried out. French Pat. No. 2,349,387 discloses an example of a process for cutting metal members of substantial thickness by a gas cutting operation, and sets forth a discussion of the problems encountered.

Finally, when using the conventional process, the maximum cutting speed, that is to say, the speed at which the cut advances across the member, hardly exceeds a value of 12 m/h, when dealing with thick members.

Both in order to reduce the amount of lost metal due to burning or a deterioration thereof, and also to enhance the level of efficiency in regard to the consumption of oxygen, efforts have always been made to produce cuts which are as narrow as possible.

For that purpose, it has already been proposed that metal members may be cut not by means of the conventional method using a jet of oxygen at a high flow rate, which issues from a single nozzle of substantial section directed perpendicularly to said surface, but by the action of a series of jets of oxygen at a lower flow rate which issue from a plurality of nozzles of small section, which pass regularly and rapidly along the bottom end portion of the cut, which forms the leading edge of the cutting action.

Thus, French Pat. No. 886,034 (Linde Air Products) describes such a process in detail. The cutting gas jets are emitted at the periphery of a distributor disc which rotates about its axis of revolution. The jets have their axes in the plane of symmetry of the disc, while being inclined with respect to the corresponding radii, that is to say, each is at the same angle of less than 90° to the tangent to the disc drawn from the intersection of the axis with the periphery of the disc. The Linde patent thus describes an apparatus comprising a rotary disc (D) which is very similar to the disc of a mechanical circular saw, the peripheral teeth of which would be replaced by a series of apertures 39 or discharge nozzles 50 from which jets of oxygen issue.

An auxiliary nozzle which is supplied with a heating gas provides for pre-heating the metal if required, at the point of attack by means of the series of jets of oxygen.

The Linde patent provides that the jets are inclined in an upstream direction in the direction of movement thereof, at an angle of from 10° to 70° with respect to the bottom portion of the cut which forms the leading edge of the cut, substantially concentric to the periphery of the disc. Linde specifies that the successive jets make it possible "successively to remove thin layers of the front wall of the cut." Linde teaches that "the discharge nozzles (50) advance in the cut at the speed at which the cut is formed."

The above-indicated arrangement in regard to the jets which are inclined forward in the direction of movement thereof with respect to the bottom of the cut appears to be very natural to any person who is familiar with the gas cutting and flaw-removal arts. It is always specified in such arts that the fusion bath should be caused to advance by pushing it in front of the jet of oxygen, this being effected while carefully avoiding "losing the bath", by moving the jet of oxygen forward at an excessive speed. In fact, by overtaking the bath, there is the danger of the jet coming into contact with metal which is still in a solid condition and which is therefore at a temperature lower than the temperature required for combustion to take place. Thus, for any person who is familiar with the above-mentioned arts, the cutting process which is put forward by Linde appears to be very rational. By analogy with the mode of operation of a mechanical saw, each tooth of which removes a shaving and increases the depth of the cut formed by the previous tooth, it appears to be very reasonable that each jet of gas should be inclined forward in the direction of movement thereof, in order to increase the depth of the groove or furrow formed by the previous jet, while pushing the molten metal and also the oxides, slag and various impurities forward in front of it.

In regard to the apparatus which is not circular but which is of the type comprising a straight blade which operates with a reciprocating movement, being the apparatus as illustrated in FIG. 1, Linde even teaches providing two sets of discharge nozzles which are each inclined in opposite directions, in order thus to operate both in the forward movement and in the return movement with a series of discharge nozzles which are inclined each time in the direction of operating movement of the blade.

Now, although application was filed for the Linde patent in 1939, the process which involves gas cutting by means of a plurality of jets of oxygen which issue at the periphery of a rotating distributor disc has not been developed hitherto.

The tests that we have been able to carry out using a mode of procedure similar to that of the Linde patent were very disappointing.

Unless excessively onerous or fragile materials are to be used, the disc buckles. If the nozzles and therefore the periphery of the disc are to be maintained in the vicinity of the leading edge of the cut, the slag which is displaced by the jets of oxygen, being inclined in the direction of rotation of the disc, causes the disc to be periodically jammed in the cut, resulting in damage thereto caused by both mechanical and thermal factors.

It may be thought that the jets of oxygen and combustion gas which displace the liquid metal and the slag at the front are disturbed by such movable obstacles, and that they are too frequently diverted from their path of movement in a random manner. It may be considered that the angular deflections of the jet with respect to the plane of symmetry of the disc are on the order of 7° on respective sides of the plane of symmetry.

The cut formed in the metal member is wide and flared out in the lower part of the metal member. The two sides of the cut are irregular. The surface condition thereof is such as to render the process useless for practical purposes. Finally, formed at the bottom of each of the two sides of the cut is a thick, strongly adhering bead of slag which also requires a subsequent cleaning operation using a pneumatic chisel or a torch. Our recent tests have thus confirmed that, even when using the present-day technology, the Linde process as described in French Pat. No. 886,034 is of no practical interest.

Before finally abandoning our tests, the idea was fortunately conceived of rotating the disc in the opposite direction to that taught by Linde, that is to say, in the opposite direction to the direction of inclination of the jets of oxygen with respect to the radii which respectively terminate at the orifices at which said jets issue, that is to say, in the opposite direction to the tangential component of the jets on issuing from the nozzles.

The metal members were attacked from the side and consequently the bottom portion of the cut, which forms the leading edge of the cutting action, was substantially vertical or at least greatly inclined with respect to the horizontal.

The disc was disposed, relative to the member to be cut, on the side thereof corresponding to a position in which the jets which are in the vicinity of the member to be cut and which are required to attack that member are directed downwardly. The disc rotated in a direction causing said nozzles to be moved in an upward direction, that is to say, in a direction of rotation opposite to the tangential speed component of the jets of oxygen on their issuing from the nozzles.

The nozzle for the heating gases was maintained at the level of the top face of the member, facing the first point of engagement of the member by the jets which move successively past in front of the disc.

Now, contrary to what could have been thought, the cut was found to be very clean and the two facing side surfaces of the cut were clear and regular. The bead of slag formed at the lower edge of the side surfaces of the cut was thin and had little adhesion to the metal member. The member was cut quickly by means of a cut of substantially narrower width than hitherto, being on the order of 10 mm. The cut made in the metal member was not flared out in the lower part of the member. The amount of metal lost was thus greatly reduced, as also was the consumption of oxygen. The molten metal and slag flowed away regularly under the effect of the force of gravity and the thrust force of the oxygen, this occurring when the relative speed of the gas with respect to the bottom portion of the cut was less than that which was used hitherto, with the disc rotating in the other direction, since, in the present case, the tangential speeds of the gas and the wheel were subtracted from each other instead of being added. The gas flow rate was probably enhanced since there was a reduced pressure and not an increased pressure at the location of the discharge orifice of the oxygen nozzles. Apparently, the flow rate of oxygen issuing from the nozzles was in particular more regular. Because the nozzles are moved in a counter-flow mode relative to the flow of molten metal and the slag, the jets of gas do not necessarily have to displace the metal and slag in a forward direction.

The invention will be better understood from the following description of a particular example of gas cutting of a metal member, carried out in accordance with the process by means of a disc-type apparatus constructed as shown in the accompanying drawings.

The accompanying drawing shows a diagrammatic view of a disc 1 having an axis 0. The disc is 8 mm in thickness and 1.050 mm in diameter. In its thickness, the disc comprises 63 radial ducts c which terminate at the circular periphery 2 of disc 1, in 63 orifices in the form of nozzles ($a_1$, $a_2$, $a_3$ ... $a_{63}$), of a diameter of 3.5 mm as measured at the neck. The 63 nozzles are regularly spaced on periphery 2 of disc 1, at distances $a$ on the order of 50 mm. The axes of these nozzles $a_1$, $a_2$ ... $a_{63}$ are all in the plane of symmetry of disc 1 and are all inclined in the same direction with respect to radial ducts c, all being disposed in the same direction at the same angle $\beta$ on the order of 15° to the tangent to the disc which is drawn from their intersection with the disc. A sector-type distributor t is illustrated diagrammatically at the center of the disc, for simultaneously feeding seven nozzles (in the situation illustrated, the nozzles $a_1$, $a_2$, $a_3$, $a_4$, $a_5$, $a_6$, and $a_7$). Reference b also diagrammatically indicates a nozzle which is supplied with combustible gas for preheating the upper part of a metal member 3 which is shown in cross-section on the plane of symmetry of disc 1. The disc has already penetrated into member 3 along a cut, the bottom 4, 5 of which forms the leading edge of the cutting action. Arrow $F_1$ indicates the direction of rotation of the disc as taught by the Linde patent, which at first sight appears to be the most logical. The arrow $F_2$ indicates the direction of forward movement of disc 1 with respect to member 3.

Seven nozzles (in the situation illustrated $a_1$ to $a_7$), on a lower lateral sector of the disc, were supplied with oxygen by way of radial ducts c and distributor t, as illustrated in the drawing, with an oxygen pressure on the order of 8 atmospheres absolute at the intake of distributor t. The oxygen flow rate was on the order of 30 $Nm^3$/h/nozzle.

The nozzle b was supplied with heating gas, oxygen and butane, and its flame was lit.

Many tests involving cutting blooms 3 of ordinary steel, being 200 mm in thickness e, were carried out with disc 1 rotating in the direction $F_1$ at a speed of 10 revolutions per second. The bloom 3 was advanced horizontally to meet disc 1, the relative displacement thereof corresponding to the direction indicated by arrow $F_2$ in the drawing, the axis 0 of disc 1 and distributor t thereof remaining above member 3. Tests were also carried out with the member being attached vertically from above, that is to say, with the disc 1 being moved downwardly into the member 3, as illustrated in FIG. 9 of the Linde patent.

In both cases, the results were very disappointing. In the best case, which was cutting horizontally, the cut indicated at 4,5 was more than 15 mm in width, with a wide flare in the lower part and unacceptable surface irregularities. The bottom of the two faces of the cut had a heavy bead of highly adherent slag, which was only removed with some difficulty by means of a pneumatic hammer. The speed of forward movement of the disc in the bloom was slow and consequently the level of oxygen consumption was high. The loss of metal corresponded to a cut which was 20 mm in width, wider than the cut produced by means of the conventional method.

In contrast, tests were carried out in accordance with the present invention, that is to say, with the disc being rotated in the opposite direction to the direction indicated by arrow $F_1$, but at the same speed of 10 revolutions per second. The results were very good.

The cut produced is clean, is only 10 mm in width, and has no flare at the bottom. The bead of slag which is formed at the bottom of each of the two side surfaces of the cut substantially does not adhere to the metal member. The volume of the beads formed is close to 10 times less than when the cut was made by causing the disc to rotate in the direction specified by Linde. The speed of advance of the cut, that is to say of disc 1 in member 3, is on the order of 1 m/min.

It will be seen from the drawing that, when disc 1 rotates in the opposite direction to $F_1$, nozzles $a_1, a_2 \ldots a_{63}$ attack member 3 from the bottom, moving back so to speak with respect to the tangential component of the jet of oxygen which is emitted in a downward direction.

The nozzles $a_1, a_2 \ldots a_{63}$ attach member 3 from the bottom, moving upward facing the leading edge of the cut at 4, 5. When a cold member 3 is to be cut, the nozzle b which is disposed at the upper part of member 3 must be supplied with heating gas in order to initiate combustion of the metal in the upper part 4 of the cut. The molten metal and hot slag then flow naturally under the effect of the force of gravity and also by the thrust of the successive downwardly directed jets of oxygen. They sustain combustion all along leading edge 4, 5 of the cut. The downwardly directed jets of oxygen move in an upward direction in cut 4, 5 so to speak in a counter-flow mode relative to the liquid metal and the hot slag. The oxygen flow is enhanced as the orifices of nozzles $a_1, a_2 \ldots a_{63}$ are under a reduced pressure and not an increased pressure, due to the direction of rotation of the disc. Moreover, all other things being equal, the molecules of gas are moving at a speed, relative to the liquid metal and the slag which flows downward toward position 5 in the cut, which is less than the speed of the molecules of gas when disc 1 rotated in direction $F_1$, in accordance with the Linde process. There is therefore no danger of blockage by the liquid metal and the slag at the outlet of the nozzles. The gas flow rate is more regular so that the cut is also more regular.

When the cut has been begun, the supply of gas to nozzle b may be interrupted. Combustion of the metal continues naturally because the jets of oxygen progress, starting from bottom 5 of the cut which is heated by the molten metal which flows downward from upper part 4 of the cut.

Other highly satisfactory tests were carried out using a disc which was 1500 mm in diameter and 6 mm in thickness, and which was provided at its periphery with 183 nozzles with a diameter of 3 mm. A cutting speed on the order of 90 m/h is attained. The bead of slag formed under the two lips of the cut is almost negligible in thickness. Finally, it is also possible to envisage a disc which is constructed in the manner of a turbine wheel comprising two side members which are joined together by simple vanes for directing the flow of gas rearward with respect to the direction of rotation of the disc. Instead of successive jets of oxygen, that arrangement then produces contiguous jets which so to speak form a continuous blade or sheet of oxygen.

If a hot metal member is to be cut, for example a slab, or a heavy metal sheet coming from a continuous casting installation, heating nozzle b may be redundant. That will probably be the most attractive application of the process.

When using the cutting process in accordance with the present invention, a cutting operation may be continued without being interrupted by a local impurity, whereas in the conventional cutting process a local defect frequently interrupts combustion and requires the cutting operation to be resumed in a sound and clean location.

The process permits juxtaposed metal members to be cut without interruption. The spacing between two members may be on the order of 10 mm without requiring the cutting operation to be recommenced, by virtue of the inclination and curvature of the leading edge of the cut at 4,5.

The principle of the present invention may also be used with cutting gases other than oxygen, for example a gas in a plasma state.

For cutting cold members, heating nozzle b may be replaced by an electric arc or a plasma nozzle.

We claim:

1. A process for cutting metal members by means of jets of gas such as oxygen emitted at the periphery of a distributor disc rotating about its axis of revolution, the jets being directed in the plane of symmetry of the disc each being at an angle of less than 90° to the tangent to the disc, which is drawn from the intersection of the axis of the jet with the periphery of the disc, characterized in that the disc is rotated in the opposite direction to the tangential component of the jets.

2. A cutting process according to claim 1 characterized in that the member is attacked laterally by means of the distributor disc, by the side of the disc of which the jets are oriented downward, and that the disc is caused to advance horizontally with respect to the member, while being rotated in the direction corresponding to an upward movement of the jets which are disposed facing the member.

* * * * *